US 10,088,988 B2

(12) United States Patent
Silberstein et al.

(10) Patent No.: US 10,088,988 B2
(45) Date of Patent: *Oct. 2, 2018

(54) METHOD AND APPARATUS FOR ENHANCING DIGITAL VIDEO EFFECTS (DVE)

(71) Applicant: GVBB HOLDINGS S.A.R.L., Luxembourg (LU)

(72) Inventors: Ralph Andrew Silberstein, Grass Valley, CA (US); Donald Johnson Childers, Grass Valley, CA (US); David Sahuc, Grass Valley, CA (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 766 days.

This patent is subject to a terminal disclaimer.

(21) Appl. No.: 14/539,603

(22) Filed: Nov. 12, 2014

(65) Prior Publication Data

US 2015/0074535 A1 Mar. 12, 2015

Related U.S. Application Data

(63) Continuation of application No. 12/450,538, filed as application No. PCT/US2007/023582 on Nov. 8, 2007, now Pat. No. 8,914,725.

(Continued)

(51) Int. Cl.
*G06F 3/0484* (2013.01)
*H04N 5/262* (2006.01)
(Continued)

(52) U.S. Cl.
CPC ........ *G06F 3/04842* (2013.01); *G06F 3/0482* (2013.01); *G06T 13/00* (2013.01); *G11B 27/034* (2013.01); *H04N 5/2628* (2013.01)

(58) Field of Classification Search
CPC ......... G06T 13/00; G06T 15/10; G06T 17/00; G06T 19/00; H04N 5/262; H04N 5/2628;
(Continued)

(56) References Cited

U.S. PATENT DOCUMENTS 4,970,666 A  11/1990  Welsh et al.
5,053,760 A  * 10/1991  Frasier .................... G06T 13/00
                                                            345/440.1
(Continued)

FOREIGN PATENT DOCUMENTS

CN    1833022       9/2006
EP    0221704 A2    5/1987
(Continued)

OTHER PUBLICATIONS

Canadian Office Action dated Nov. 9, 2015, regarding Canadian Application No. 2,682,935.
(Continued)

*Primary Examiner* — Nicholas S Ulrich
(74) *Attorney, Agent, or Firm* — Arent Fox LLP (57) ABSTRACT

A method and apparatus for enhancing digital video effects (DVE) operates to embed DVE functionality within a graphics modeling system and provides the user with an interface configured to present model elements to a user as controllable parameters. In order to embed DVE functionality, a dynamic data structure is introduced as a scene to allow the addition of user defined model elements. The user interface enables the identification of, and access to the newly introduced model elements.

17 Claims, 7 Drawing Sheets

Related U.S. Application Data (60) Provisional application No. 60/922,849, filed on Apr. 11, 2007.

(51) Int. Cl.
*G06T 13/00* (2011.01)
*G06F 3/0482* (2013.01)
*G11B 27/034* (2006.01)

(58) Field of Classification Search
CPC ... H04N 9/74; G06F 3/04845; G06F 3/04842; G06F 3/0482; G11B 27/034
See application file for complete search history.

(56) References Cited

U.S. PATENT DOCUMENTS

| | | | |
|---|---|---|---|
| 5,412,401 A | 5/1995 | Wolf et al. | |
| 5,461,706 A | 10/1995 | Trow et al. | |
| 5,638,133 A | 6/1997 | Squier et al. | |
| 5,694,533 A | 12/1997 | Richards et al. | |
| 6,028,645 A | 2/2000 | Reid et al. | |
| 6,069,668 A | 5/2000 | Woodham et al. | |
| 6,021,229 A | 10/2000 | Takashima et al. | |
| 6,239,846 B1 | 5/2001 | Billing | |
| 6,369,835 B1 | 4/2002 | Lin | |
| 6,452,598 B1 | 9/2002 | Rafey et al. | |
| 6,501,476 B1 * | 12/2002 | Gould | G06T 15/00 345/473 |
| 6,583,793 B1 | 6/2003 | Gould et al. | |
| 7,265,756 B2 | 9/2007 | Schneider et al. | |
| 7,756,391 B1 | 7/2010 | Trottier et al. | |
| 8,111,283 B2 | 2/2012 | Kim et al. | |
| 2002/0036639 A1 | 3/2002 | Bourges-Sevenier | |
| 2002/0101430 A1 | 8/2002 | Duquesnois | |
| 2003/0000674 A1 | 4/2003 | Fujiwara | |
| 2004/0207665 A1 | 10/2004 | Mathur | |
| 2004/0210945 A1 | 10/2004 | Snyder et al. | |
| 2005/0030432 A1 | 2/2005 | Ross et al. | |
| 2005/0088458 A1 | 4/2005 | Marrin et al. | |
| 2005/0231643 A1 | 10/2005 | Ross et al. | |
| 2007/0074117 A1 | 3/2007 | Tian et al. | |
| 2007/0001327 A1 | 6/2007 | Hassner et al. | |
| 2007/0216675 A1 | 9/2007 | Sun et al. | |
| 2010/0150526 A1 | 6/2010 | Rose et al. | |

FOREIGN PATENT DOCUMENTS

| | | |
|---|---|---|
| EP | 1703469 | 9/2006 |
| JP | 62-095666 A | 5/1987 |
| JP | 2006505050 A | 2/2006 |
| JP | 2007013874 A2 | 1/2007 |

OTHER PUBLICATIONS

Canadian Office Action dated Dec. 19, 2014, regarding Canadian Application No. 2,682,935.
Abstract of Japanese Patent Publication No. 2007-013874, dated Jan. 18, 2007.
Abstract of WO/2004/042659 dated May 21, 2004 (corresponding with JP 2006-505050).
Notification of Reasons for Refusal in Japanese Application No. 2010-502988 dated Aug. 21, 2012.
First Office Action in Chinese Application No. 200780052535.1 dated Dec. 6, 2010.
Second Office Action in Chinese Application No. 200780052535.1 dated Feb. 6, 2012.
Third Office Action in Chinese Application No. 200780052535.1 dated Aug. 31, 2012.
International Preliminary Report on Patentability dated Oct. 13, 2009, Search Report and Written Opinion dated May 2, 2008, regarding PCT/US2007/023582.
Notice of Allowance for Japanese Patent Application No. 2010-502988 issued by the Japanese Patent Office dated Dec. 25, 2012.
Shirakawa et al."Recent and Future Technology of Digital Video Effects", Journal of the institute of Television Engineers of Japan, vol. 47, No. 9 , pp. 1196-1203, Sep. 1993, 8 ref, Japan.
"Matrox Flex 3D" Matrox Digital Video Solutions, pp. 1-3, May 10, 2000, XP00247704.
Podesla et al.:"Integrating True 3-D Digital Video Effects Processing wit Real-Time Computer Graphics" SMPTE Journal Feb. 1995, pp. 77-81.
EP Office Action dated Jan. 13, 2011, regarding EP Application No. 07861863.4.

* cited by examiner

FIG. 8d ered in

METHOD AND APPARATUS FOR ENHANCING DIGITAL VIDEO EFFECTS (DVE)

CROSS-REFERENCE TO RELATED APPLICATIONS

This application is a continuation of U.S. patent application Ser. No. 12/450,538, entitled "METHOD AND APPARATUS FOR ENHANCING DIGITAL VIDEO EFFECTS (DVE)," filed Sep. 29, 2009, which claims priority under 35 U.S.C. § 365 of International Application PCT/US2007/023582 filed Nov. 8, 2007 and which claims priority to U.S. Provisional Patent Application Ser. No 60/922,849, filed 11 Apr. 2007, the teachings of each of which are incorporated herein.

BACKGROUND

Technical Field

The present principles relate to digital video effects (DVE) systems. More particularly, they relate to a method and apparatus for providing user enhanceable DVE.

Description of Related Art

In general, video effects are used to produce transformations of still or moving pictures or rendered visual objects. Typical examples of video effects include but are not limited to: video image 3-space transforms such as scaling, locating, rotating, etc.; pixel-based video image processing such as defocus, chromatic shift, etc.; and other manipulations or combinations of transformations such as bending, slicing, or warping of the video image surface(s) into different forms.

Video Effect production falls into two distinct categories: Live and Pre-built.

Live Broadcast Video Effects allow the technician to transform live video while meeting video broadcast real-time demands. Products that produce Live Broadcast Video Effects have various names and trademark names and will herein be referred to by the commonly used (NEC trademarked) acronym DVE, which stands for Digital Video Effects. Currently in DVE products, Live Broadcast Video Effects are created by controlling a set of parameters within a DVE system. Most of these parameters act upon ingested video images. The effect-creating live broadcast technician is able to manipulate this set of factory-created parameters, which are pre-determined and limited by the product design.

Pre-built Video Effects allow a graphics artist to produce an effect in non-real-time and record resultant individual image frames into a video clip that is appropriate for real-time playback. Pre-built Video Effects utilize images created by graphics artists and related technicians. These images are often generated by creating and rendering 3D virtual objects, as is typical to many 3D or Computer Aided Design (CAD) modeling systems. The virtual objects and related elements are created by making a 3D model or by other constructive means and then manipulated by varying the constructive parameters of that model. The Pre-built Video Effect is made by recording the rendered images into a 2D video format one frame at a time.

SUMMARY

According to one aspect of the present invention, there is provided a method for providing digital video effects that commences by mapping video onto a graphics model having at least two dimensions. Elements of the graphics model are assigned as user controllable parameter. At least one of a video output signal and a key are produced in response to user adjustment of a controllable parameter.

According to another aspect, the present principles provides a method for providing digital video effects including the steps of embedding DVE functionality within a graphics modeling system, providing a user interface configured to present model elements to a user as controllable parameters, and outputting a video and/or a key in response to a user input.

The embedding aspect can include introducing a dynamic data structure as a scene to allow the addition of user defined model elements, and providing a user interface to identify and access the newly introduced model elements using typed information.

The introducing aspect can further includes creating a specialized set of customized objects (nodes) in the graphics modeling system, said customized objects including DVE objects as new parts of the scene. During the introducing aspect, values of parameters are set as a key frame in a timeline According to another implementation, the dynamic data structure is defined through a description language. The definition of the description language is such that it can be converted to and from a 3D authoring tool.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Early DVE products were designed to help mix video channels by resizing and positioning the image over a background. In order to provide smooth transitions, "video effects" were created, utilizing the concepts of key-framing and interpolation to generate controlled changes. Desired positions or states are captured as time-based key-frames, or control points for interpolation. The resultant effect is produced by an interpolation of intermediate values while moving in time from key-frame to key-frame, usually with the intent to produce a smooth or continuous change in the image, or some other desirable characteristic. Those "traditional" DVEs directly process the video pixels.

Traditional Digital Video Effects (DVE) systems in the broadcast domain allow live broadcast technicians to control a fixed set of parameters for the purpose of creating video effects. The User Enhanceable DVE (UE-DVE) is a more advanced type of DVE which allows live broadcast technicians to introduce new elements into the effects building domain and control those elements to produce real-time broadcast quality video effects having ranges of motion, video representations and forms that are beyond those initially provided by the physical product.

Figure 1:
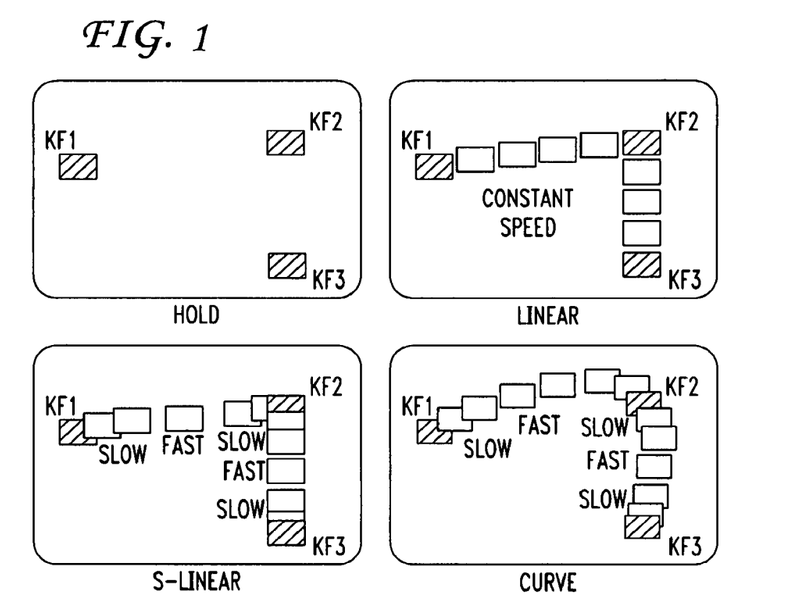
FIG. 1 is an example of several interpolation algorithms applied to a simple 3 key-frame effect showing change of location.

FIG. 1 shows an example of several interpolation algorithms applied to a simple 3 key-frame effect (KF1, KF2, KF3) showing change of location. The algorithms shown are "Hold", "Linear", "S-Linear" and "Curve".

Figure 2:
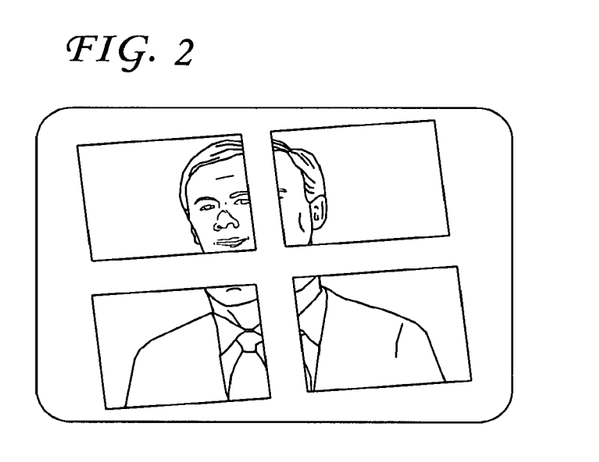
FIG. 2 is an example of splits applied to a re-sized rotated image.

As DVEs have evolved over the years, more sophisticated features such as planar warps, lighting, defocus, etc. have been added, so that the typical DVE today may have a wide variety of features. However, there are certain key features which are necessary for a DVE to be viable for usage in Live Broadcast Production. In addition to being able to produce at least full 10-bit resolution video input and output in real-time, a viable DVE must have a short pipeline delay (less than 3 frames or 0.05 second latency between the time a particular video frame enters and exits the DVE), be able to output both a video and key, support insertion and editing of key-frames, and support key-framing/interpolation run controls for effects. Primary Video Effects-building functionality must include support for the ability to transform an image in 3-D space (including locate, resize, and rotate in 3 dimensions, and image skew, cropping, and aspect ratio change). To be a DVE suitable for mid-range to high-end production quality, some additional features such as interpolation path controls, shadows, splits, mirrors, slits, defocus, lights, and various warps such as page turn, ripple, or position modulations are generally needed. FIG. 2 shows what it would look like when splits are applied to a re-sized and rotated image.

However, for live broadcast DVEs, current systems continue to use the image-processing-centric paradigm of processing pixels from the input image using 3-D transform mathematics and projecting the result back into 2D for output as a single video or video and key image (This type of system is sometimes called "2.5D"). Multiple images from different DVEs (e.g. other sources) can then be composed or "keyed" onto a background for the final result.

Figure 3A:
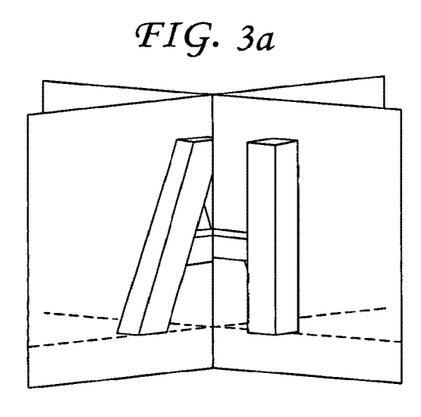
FIG. 3a is a graphical view of 3D objects rasterized to 2D buffers (usually called images) and then combined into a 3D buffer.
Figure 3B:
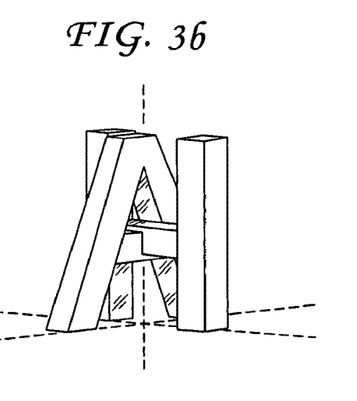
FIG. 3b is a graphical view of 3D objects combined first and then rasterized into the same 3D buffer.

Since these are planar images, the ability to model these images as a 3D scene is often limited to layering or combining the resultant keyed 2D images. One enhancement that is sometimes used is to use a combiner following the DVEs. Some DVEs can produce a depth key which can be used to correctly combine more than one DVE output so that they can be correctly shown combined as intersecting 3D planes. However, even in this case, the result is limited to combining planar images. For example, referring to FIGS. 3a and 3b, if two DVEs are sizing and locating an un-warped video image of 3D letters "A" and "H" so that the images intersect, the combiner will show a straight line intersection of the two video image planes rather than the 3D virtual object intersection that would be produced by a 3D modeling system.

Figure 4:
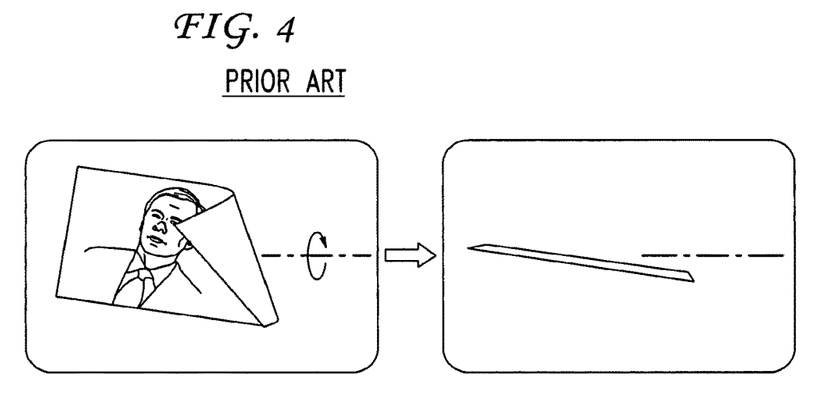
FIG. 4 is a graphical view of a 2.5D page turn result following rotation according to DVE systems of the prior art.

Although there are many interesting features provided by current DVEs, the features are limited to built-in functionality that is applied to the video, controllable by a fixed set of parameters. True, fairly sophisticated effects can be achieved with this technique, but the results must be carefully managed to maintain the full 3D illusion. An example of this would be a "page turn" effect (see, e.g., FIG. 4), in which the video image is removed from the screen by simulating the roll-off of a page. However, if the page turn image is subsequently rotated to an on-edge position, it is obvious that it is a "2.5D system" using a 2D projection of a 3D "turned page".

Present day DVEs do not provide a means to construct a new model. For example, if a user wanted to create an effect by wrapping the video image onto the surface of a cone, this would not be possible (unless the product designers had implemented this particular feature and provided parameters for controlling it). Thus, in order to achieve this result, the user would need to rely upon a graphics artist or non-real-time content creator solution, where the appropriate model (a cone) has been rendered. However, to map live video onto this surface may not be possible as the image would be pre-recorded. (Note: The pre-rendered reverse address (PRA)-DVE device does allow a live image to be mapped, but again requires special preparation. See the discussion relating to PRA-DVE below).

There has been a trend to integrate DVEs into Video Broadcast Switchers (aka Video Production Centers, Video Mixers). Recent switchers such as the Grass Valley's Kalypso have internal DVEs, also known as "Transform Engines". With these internal DVEs, video sources can be locally processed without sending the signal to an external stand-alone system, providing benefits in terms of integrated control, effects, and reduced pipeline delay. The functionality of internal or integrated DVEs is almost identical to stand-alone DVEs.

The traditional DVE operates in the following manner. The work buffer defines the current state of the system including its position in 3D space and its warp controls. The transforms are combined into a final result transform matrix and the warp controls. The final result matrix is converted into a reverse address matrix. These results are passed to a set of hardware Reverse Address Generator (RAG) transform registers and warp control registers. The reverse address generator has a fixed set of registers which include the reverse address matrix and the warp controls. The output control clock steps through the output pixels starting at pixel one line one and stepping to the next pixel in the output buffer. The clock also triggers the RAG to use the values the software placed into the fixed registers (reverse transform matrix and the warp controls) to calculate the addresses of the source pixels used to create the next output pixel. Steps 4 and 5 are repeated until the entire output image is complete.

This design relies on a fixed set of controls for the live broadcast technician: fixed registers for the RAG control; and, fixed formulas in the RAG hardware. An advantage of this design is that the operator of the DVE can change any factory defined, key-framable parameter of the effect on the DVE itself and immediately play back this effect that can position, warp and process live video. The disadvantage is that the DVE can only perform the limited set of warps and effects that are designed into it by the DVE manufacturer, and the fact that no true 3D models can be created by the DVE limits the types of effects that can be performed.

Another approach to a DVE is the Pre-rendered Reverse Address DVE (PRA-DVE). A custom 3D software package is used to create the effect desired. This includes all aspects of the effect including duration, position in 3D space and warps. The custom 3D package then performs the reverse address generation (RAG) calculation in non-real time. These addresses are then saved to storage media for later playback. This process can take several minutes. When the operator wants to play back the effect, the output control clock steps through the output pixels starting at pixel one line one and stepping through the output image. Where a traditional DVE would use RAG hardware to calculate the reverse addresses on the fly, the PRA-DVE reads the reverse addresses back from the storage media and uses those addresses to grab the appropriate source image pixels to use to create output image.

Although this approach allows for a wide variety of effects, the traditional DVE operator has no access to any of the key-frameable parameters on the DVE itself. In order to make any changes to the effects, an operator must go back to the specialized software, change the effect, recalculate the reverse addresses, transfer the addresses to the storage media, load the reverse addresses from the storage media into the DVE, and then play back the effect. This process must be followed for the smallest of changes to the effect including duration of the effect, position of objects, lighting, etc and can take a great deal of time.

Another disadvantage is that the skills required for using a 3D animation package and the skills required to be a live broadcast technician are different and usually require two different people.

The PRA-DVE relies completely on the custom offline animation software to perform the reverse address generation. An advantage of the PRA-DVE is that the user can create effects with almost any shape with live video. A disadvantage of the PRA-DVE is that creating and changing effects is very time consuming.

For all practical purposes, 3D effects cannot be changed at normal DVE effect editing speeds and will require the graphics artist in addition to the live broadcast technician. This greatly limits the usefulness of the PRA-DVE architecture in a live production situation.

The user enhanceable (UE)-DVE of the present principles is a new type of DVE which is created with and embedded within a 2D and/or 3D graphics modeling system. A collection of specific graphics objects have been created (i.e. a model) which replicates major portions of the traditional DVE system functionality by using graphics modeling system elements, while still achieving the real-time performance needed to meet video broadcast requirements. By embedding the DVE functionality within a graphics modeling system rather than ingesting 2D video recordings into a video mixing domain, effects having live video can be created interactively within a graphics environment. For replication of traditional DVE effects, the Live Video is mapped to a virtual surface(s) within the model to produce a result equivalent to a traditional video presentation and behaviors. However, the constraint of factory-created parameters is removed. New graphics model elements can be introduced by the user to create new features.

For enabling this capability, the present principles utilizes a dynamic data structure, rather than a static data structure (as known from the prior art). This allows the definition of objects and parameters for support of legacy DVE features but also enables the creation of new objects and parameters by either a content creator who provides new effects for the UE-DVE platform or the platform operator. According to the present principles, this dynamic data structure is called a scene (See element 712 in FIG. 7). In one implementation, this scene is represented through the form of a scene graph. This data structure provides an Application Programming Interface (API) to identify and access new objects and parameters using typed information (e.g., floating color or percentage value) along with higher level semantics.

Thus, through this API, elements can be identified and bound to effects-creating systems, allowing read and write access, and thereby achieving effects-creating functionality. For example, the user can import a particular new model identify its elements (fields), read the current values in selected fields, and then, having saved those values into key frames, write those values or interpolated values back into their respective field: i.e., build and run effects.

Figure 7:
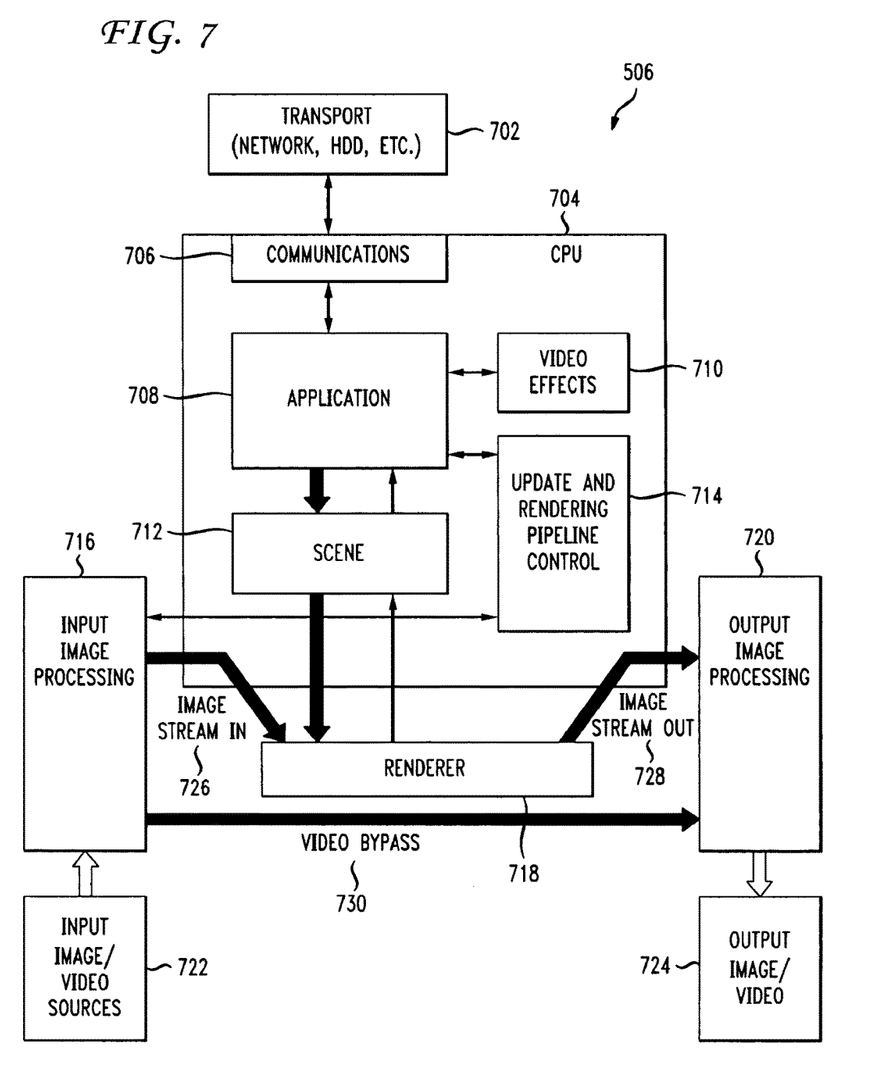
FIG. 7 is a schematic diagram of the UE-DVE frame unit according to an implementation of the present principles.

This dynamic structure also offers programmable components in order to add new user-defined DVEs and image processing (video pixels manipulation) through the use of scripting language and/or common graphics shader code which can be dynamically compiled or interpreted into the rendered (See element 718 in FIG. 7).

In general, the present principles provide the user with expanded creative opportunities by allowing the introduction of new features with which to build effects. The dynamic data structure is defined through a description language, which is preferably one (1) or more of the support syntaxes from 3D authoring tools, or through the use of converters for converting the description language to and from a 3D authoring tool. Those of skill in the art will recognize that different description languages and 3D authoring tools may be used without departing from the scope of the present principles. Some examples of description languages that could be use are VRML, X3D, COLLADA, etc., while some examples of 3D authoring tools can be Autodesk Maya, Autodesk 3D Studio, Blender, Softimage, etc.

A user can then simply follow the given syntax to create new object and/or parameters or externally create them by the use of third party authoring tools. To help with importing of new externally defined objects and parameters, a set of User Interfaces can be provided along with the UA-DVE, as shown by element 508 in FIG. 5. Those User Interfaces will control the UA-DVE in a friendly manner to the user in order to perform the imports and necessary conversions; some of those User Interfaces can also use the UA-DVE Scene APIs (or other user interfaces) to dynamically create object and parameters directly within the UA-DVE platform. These features include the ability to represent live video elements fully within a 3D modeling environment with all the inherent capacity of any graphics object in such an environment, including but not limited to reproducing the appearance of real graphics objects. These features are realized by introduction of models or model elements into the graphics modeling system, or changing model elements, and then, by virtue of the fact that the model elements are presented to the user as controllable parameters, by setting the values of these parameters as key-frames in a timeline to form Live Broadcast Video Effects which can be recalled and run.

The present principles also promises to reduce production costs associated with the traditional graphics artist content creation workflow. For example, when a live broadcast technician wants to utilize a traditional graphics department effect, modifications can only be made by the graphics artist, who must re-render the effect into a video clip. However, with UE-DVE of the present principles, the ability to modify some or all of the object parameters directly can be provided to the live broadcast technician to make modifications in the studio and immediately render the effect live in real-time. This can easily be performed for any object's parameters (imported or not) since the dynamic data syntax furnishes typed parameters information for any object of the Scene; those can then be controlled through timelines, as usually performed in legacy DVEs, by defining their values for a user defined number of key frames and types of interpolations.

The UE-DVE system of the present principles reproduces the behavior of a DVE and more by realizing a fully functional graphical model of a DVE within a Virtual 3D Objects scene.

Figure 5:
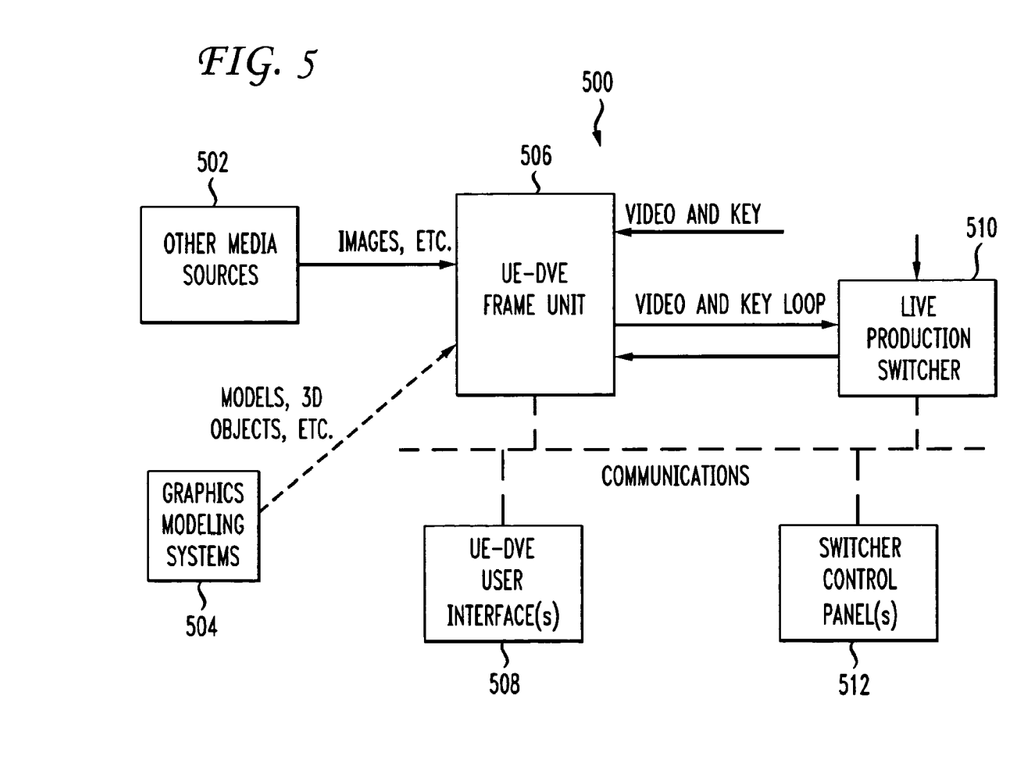
FIG. 5 is a block diagram of a the UA-DVE according to an implementation of the present principles.

Referring to FIG. 5, there is shown an exemplary implementation of the UE-DVE system 500 according to the present principles. The graphics objects' synchronized or Gen-locked live video inputs are supplied to the system by the graphics modeling system 504, along with still pictures and other data from other media sources 502. The computed resultant images are output from the UE-DVE frame unit 506 as live video. Controlling parameters for this DVE model are accessible through the UE-DVE User Interfaces (UI) 508. Additional common control methods may also be supported via various protocols, e.g. over Ethernet or serial connections (e.g. Sony BVW-75, PBus2, etc).

The key functionality of the UE-DVE system 500 is contained within the UE-DVE Frame Unit 506, which houses the UE-DVE Software Application, a Rendering System, an Input Image Processing system, and an Output Image Processing system (see FIG. 7). The Software performs the DVE activities and supports video input and output channels, as well as various connections for communications and alternative media or data transport, e.g. network or hard drive access. The UE-DVE Frame Unit 506 is designed to work in harmony with other video production units such as a Live Production Switcher 510, as shown in FIG. 5. Physical connections for video input and output attach to the Unit 506, and network connections and various serial device connections are provided to the Unit as well.

Figure 6A:
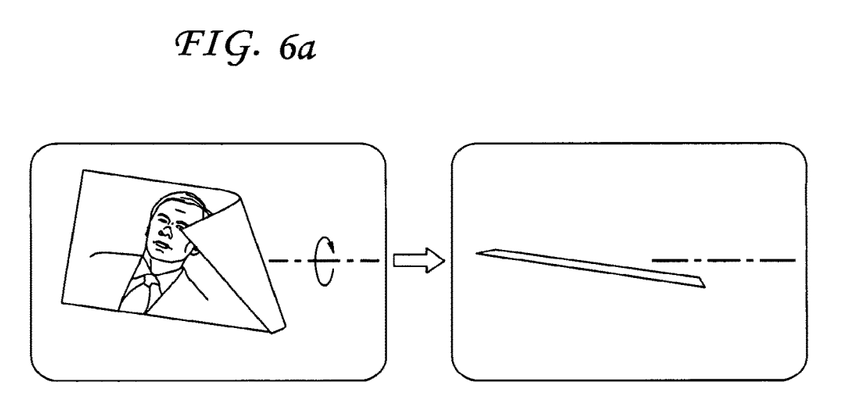
FIG. 6a is a graphical view of the 2.5D page turn result showing FIG. 4.
Figure 6B:
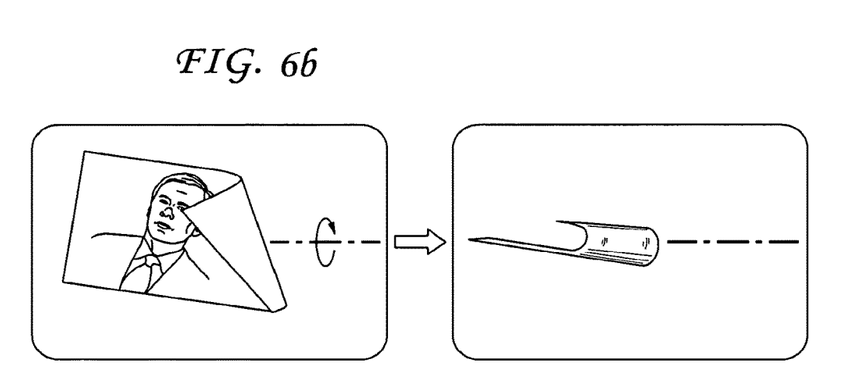
FIG. 6b is a graphical view of a 3D page turn result according to an implementation of the UA-DVE of the present principles.

The UE-DVE of the present principles provides a default model which supports most traditional DVE features. For example, a page-turn effect can be created by selecting the correct warp mode and setting the page turn offset, radius, and orientation. The position of the video image as a whole can be set by controlling the location and rotation parameters. One distinguishing difference, as shown in FIG. 6 below, is that within the traditional DVE system the page turn is not produced in a true 3D modeling system (i.e. "2.5D"), so when it is rotated it appears incorrect (See FIG. 4), while the UE-DVE page turn, shown in FIGS. 6a and 6b, looks correct from any angle because it is truly rendered as a 3D object within a 3D scene.

Like traditional DVEs, the UE-DVE provides functionality for building Live Video Effects. Effects which capture one or more key-frames of the desired scene can be built in the traditional way by setting the system to the desired state and then saving the state as a key-frame within an effect.

Since Graphics objects can be composed into the same frame buffer, they can intersect with each other (Note that the UE-DVE of the present principles also offers the possibility to intentionally avoid those intersections by adding Compositing Layers which provide separate frame buffers and can be combined all together as overlays upon output).

Most significantly, the UE-DVE of the present principles has the ability to add new DVE features. These can be created by introducing changes or additions to the default model. For example, the changes or additions can be model elements presented to the user as controllable parameters. Some useful elements are provided internally for easy addition, such as Lights, Cameras, Layers, and Transform nodes. Other models or model elements can be imported as files using common descriptive languages such as VRML, X3D or COLLADA.

For example, a full 3D model of a human head could be imported into the UE-DVE, and the skin of the human head model can then be dynamically wrapped with a live video image.

In all cases, correctly identified elements within the scene are automatically bound to the UE-DVE parameter system, providing a means to control those elements.

The UE-DVE is a system which introduces the creative capacities of a Graphics Modeling system into a DVE, making it possible for users such as graphics artists to introduce new model elements which provide new DVE features while satisfying the strict requirements of the live broadcast environment.

The introduced elements can be controlled by the UE-DVE user. Thus, a live broadcast technician can make rapid changes to the scene as needed without having to return to an offline animation system, and real-time Live Broadcast Video Effects can be built utilizing this capability. This will result in a saving of production time.

The UE-DVE of the present principles exceeds the capability of the Pre-rendered Reverse Address (PRA) DVE and yet provides the speed and ease of editing effects of a traditional DVE. New levels of creativity will be possible for live broadcast technicians using the UE-DVE.

FIG. 7 shows an exemplary implementation of the UA-DVE frame unit 506 of the present principles. The transport 702 is a physical connection to the user interfaces 508 and other devices (e.g., HDD for transport of controlling signals), and can be network like connections, such as, for example, Ethernet, wireless, IEEE 1394, serial, parallel, etc. The central processing unit(s) CPU 704 executes the Frame Software Communications 706, and controls data between the Application 708 and the Transport 702, performing appropriate translations as needed.

At the application 708, the general system functionality is managed, including but not limited to configuration, the processing of commands from the User Interface(s), loading, management, editing and running of Video Effects, establishing and maintaining the access to elements within Scene, update of Scene state, and high level control of the real-time rendering processes.

A video effects storage 710 maintains (stores) values for Video Effects in the form of Key-frames and other effect data.

The scene 712 contains the state of the image producing system, which, upon rendering and related processing, produces the resultant output video images. The scene block 712 can use scene-graphs and other representations of the dynamic structure.

The Update and Rendering Pipeline Control 714 manages the real-time demands of the system. The running of effects (i.e. interpolation) through Application 708 is synchronized so that Scene 712 is updated at the correct time and the Rendering is done at the correct time to synchronize with the video genlock.

The Input Image Processing 716 receives input images/video sources 722 in the form of a Serial Digital Interface (SDI) and/or other video and still picture inputs and processes the input images into internal representations. This processing may include de-interlacing, application of keys, format conversions, filtering, and other image processing activities. The Input Image/Video Sources 722 provides physical Connections such as High Definition Display (HDD) or co-axial cables transport Images (e.g. video and/or key signals and genlock signals using SDI format and/or other video formats into the system.)

A Renderer 718 uses the constructs defined by Scene 712 to render an image for output as controlled by the Rendering Pipeline Control 714, utilizing Input Video or other sources or means 722. This Renderer can be either software or hardware components or mix of those two. Its main purpose is to be able to perform the rasterization in real time, e.g., within video field rate constraints. The Rasterization process includes mapping of any video or still image on objects by a mapping means. In one implementation, the renderer constitutes a Graphics Processing Unit (GPU) used through an OpenGL interface. Other embodiments could support software or hardware that implement accelerated Ray Tracing Algorithms.

The Output Image Processing 720 processes internal representations of video images and outputs as SDI and/or other video formats. The processing may include, but is not limited to, interlacing, filtering, mixing, cropping, and format conversions. The Output Image/video 724 provides physical connections such as HDD or co-axial cables transport images (e.g., video and/or key signals and genlock signals out of the system.)

The Image Stream 726 transfers picture data from the Input Image Processing 716 to the Renderer 718. The Image Stream Output means 728 transfers picture data from the Renderer 718 to the Output Image Processing 720. The Image Bypass 730 enables the Image to be sent directly from the Input Image Processing 716 to the Output Image Processing 720.

Figure 8A:
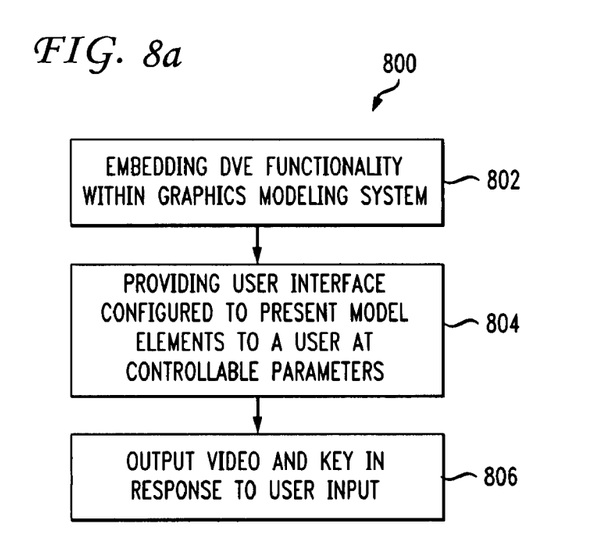
FIG. 8a is a flow diagram of the method according to an implementation of the present principles.

FIG. 8a shows a basic flow diagram of the method 800 according to the present principles. Initially the DVE functionality is embedded within the graphics modeling system (802). The embedding includes introducing (e.g., mapping) model elements into the modeling system utilizing a dynamic data structure. Those of skill in the art will recognize that this dynamic data structure can be in the form of a scene. Once embedded, a user interface is provided which is configured to present model elements to the user as controllable parameters (804). In response to a user input, the video and key are output (806).

Figure 8B:
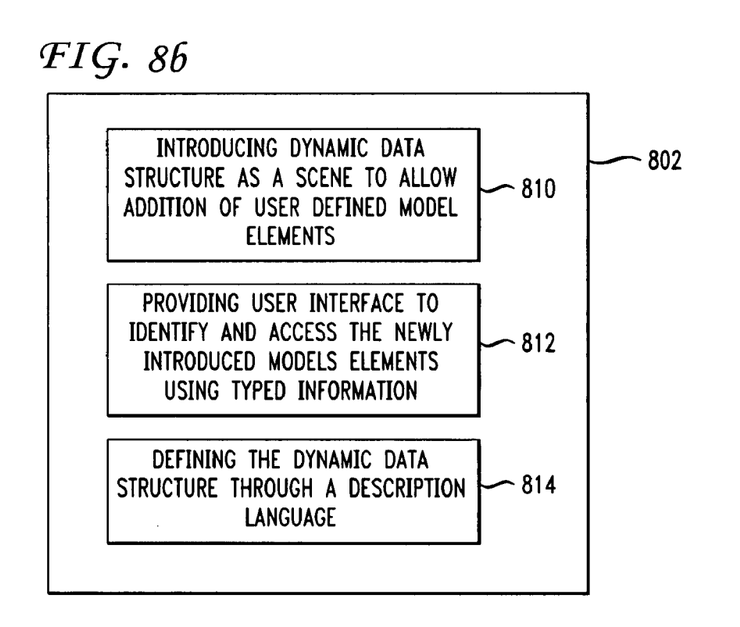
FIG. 8b is a detailed diagram of one of the method steps according to an implementation of the present principles.

FIG. 8b shows the embedding step 802 according to an implementation of the present principles. The embedding 802 can include introducing dynamic data structure (810) as a scene to allow addition of user defined elements. Once done, the user is provided (812) with an interface to identify and access the newly introduced model elements using typed information. As shown, the defining of the dynamic data structure is done through a description language (814).

Figure 8C:
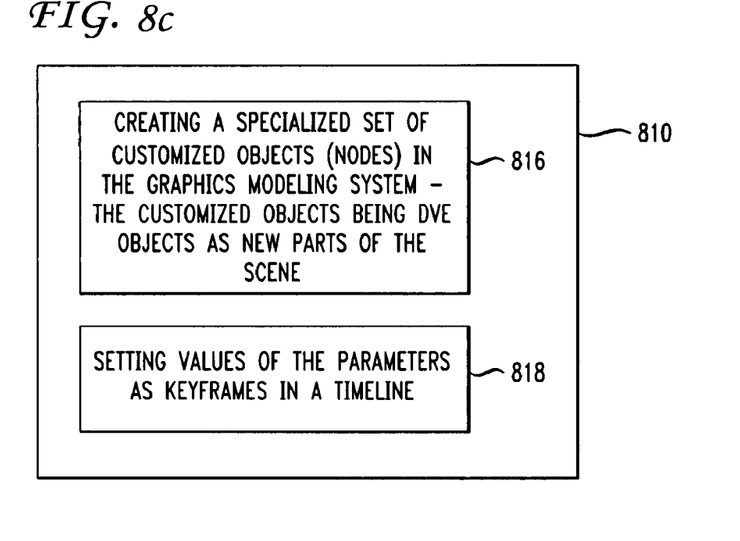
FIG. 8c is a detailed diagram of another one of the method steps according to an implementation of the present principles.

FIG. 8c shows the introducing step (810) according to an implementation of the present principles. The introducing step (810) can be performed by creating (816) a specialized set of customized objects (nodes) in the graphics modeling system. The customized objects constitute DVE objects as new parts of the scene. The parameter values can then be set (818) as key frames in a timeline.

Figure 8D:
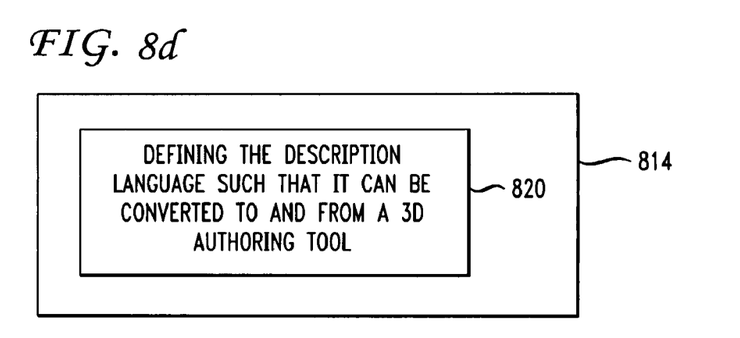
FIG. 8d is a detailed diagram of another one of the method steps according to an implementation of the present principles.

FIG. 8d shows the defining step (814) according to an implementation of the present principles. Accordingly, the defining of the dynamic data structure (814) can be performed by defining the description language such that it can be converted to and from a 3D authoring tool (820).

Features and aspects of described implementations may be applied to various applications. Applications include, for example, individuals using host devices in their homes to communicate with the Internet using an Ethernet-over-cable communication framework, as described above. However, the features and aspects herein described may be adapted for other application areas and, accordingly, other applications are possible and envisioned. For example, users may be located outside of their homes, such as, for example, in public spaces or at their jobs. Additionally, protocols and communication media other than Ethernet and cable may be used. For example, data may be sent and received over (and using protocols associated with) fiber optic cables, universal serial bus (USB) cables, small computer system interface (SCSI) cables, telephone lines, digital subscriber line/loop (DSL) lines, satellite connections, line-of-sight connections, and cellular connections.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data transmission and reception. Examples of equipment include video coders, video decoders, video codecs, web servers, set-top boxes, laptops, personal computers, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream, and modulating a carrier with the packetized stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed.

The invention claimed is:

1. A method for providing digital video effects in broadcast video production, the method comprising:
    providing a system having digital video effects (DVE) functionality and graphics modeling functionality;
    providing an Application Programming Interface (API) for identifying and accessing elements of a graphics model;
    presenting the elements of the graphics model to a user as user controllable DVE parameters, wherein the DVE parameters are bound to the elements of the graphics model by the API such that manipulations to the DVE parameters cause the API to access the graphics model elements and make corresponding manipulations to the respective graphics model elements;
    presenting desired positions or states of the user controllable DVE parameters as key-frames in a timeline to form live broadcast video effects; and
    outputting at least one of a video and a key in response to user input.

2. The method of claim 1, further comprising:
    interpolating intermediate values of the user controllable DVE parameters from key-frame to key-frame to produce a video output signal and a key using the graphics model in response to user adjustment of a user controllable DVE parameter.

3. The method of claim 2, wherein outputting the at least one of the video and the key includes providing the video output signal and key to a live video production switcher.

4. The method of claim 1, further comprising:
    receiving a live video input into the system; and
    mapping the live video input onto at least one virtual surface of a graphics model having at least two dimensions.

5. The method of claim 1, further comprising:
    producing a video output signal and the key by rendering at least one effect on a live video input based on a model having parameters controlled via a user interface, including mapping the live video input onto the graphics model.

6. The method of claim 1, further comprising:
    receiving, via a user interface, a new graphics model element that comprises at least one of a range of motion, a video representation, and a form beyond the graphics model elements initially provided by the system.

7. The method of claim 1, wherein the user controllable DVE parameters include at least one of image skew, cropping, aspect ratio change, interpolation path controls, shadows, splits, mirrors, slits, defocus, lights, and warps.

8. The method of claim 1, wherein the graphics model can be warped.

9. The method of claim 1, wherein said providing the system comprises:
    introducing a dynamic data structure as a scene to allow an addition of user defined model elements.

10. The method of claim 9, wherein said introducing comprises:
    creating a specialized set of customized objects in the system, said customized objects comprising DVE objects as new parts of the scene.

11. The method of claim 9, further comprising defining the dynamic data structure through a description language such that the dynamic data structure is configured to be converted to and from a 3D authoring tool.

12. An apparatus for dynamically modifying digital video effects in broadcast video production, comprising:
    an input image processor configured to receive at least one image;
    an image editor providing digital video effects (DVE) functionality and graphics modeling functionality;
    a graphics model generator having an Application Programming Interface (API) for accessing the image editor to generate a graphics model for the received at least one image based on the graphics modeling functionality;
    a user interface configured to present elements of the generated graphics model to a user as user controllable DVE parameters, wherein the DVE parameters are automatically bound to the elements of the generated graphics model by the API such that image editing manipulations to the user controllable DVE parameters cause the API to make corresponding manipulations to the graphics model elements; and
    an output image processor configured to output a modified image output in response to the image editing manipulations,
    wherein the user interface presents desired positions or states of the user controllable DVE parameters to the user as key-frames in a timeline to form live broadcast video effects.

13. The apparatus of claim 12, wherein the output image processor is further configured to:
    interpolate intermediate values of the user controllable DVE parameters from key-frame to key-frame to produce the modified image output using the graphics model in response to user adjustment of at least one of the user controllable DVE parameters; and
    output the modified image output to a live video production switcher.

14. The apparatus of claim 12,
    wherein the input image processor is further configured to receive the at least one image as a live video input; and
    wherein the graphics model generator is configured to map the live video input onto at least one virtual surface of the generated graphics model having at least two dimensions.

15. The apparatus of claim 12, wherein the image editor is further configured to receive, via the user interface, a new graphics model element that comprises at least one of a range of motion, a video representation, and a form beyond the graphics model elements initially provided by the system.

16. The apparatus of claim 12, wherein the user controllable DVE parameters include at least one of image skew, cropping, aspect ratio change, interpolation path controls, shadows, splits, mirrors, slits, defocus, lights, and warps.

17. The apparatus of claim 12, wherein the graphics model generator is further configured to:
   introduce a dynamic data structure as a scene to allow an addition of user defined model elements.

* * * * *